METHOD OF MAKING SANDWICHED MAGNETIC THIN FILM MEMORY

Filed May 3, 1963 2 Sheets-Sheet 1

METHOD OF MAKING SANDWICHED MAGNETIC THIN FILM MEMORY

Filed May 3, 1963 2 Sheets-Sheet 2

WITNESSES
Theodore F. Wrobel
James F. Young

INVENTORS
Mike Lauriente, Gordon E. Lynn
Edward R. Higgins and John M. Winter, Jr.
BY Dean Schron
ATTORNEY

United States Patent Office 3,362,065
Patented Jan. 9, 1968

3,362,065

METHOD OF MAKING SANDWICHED MAGNETIC THIN FILM MEMORY

Mike Lauriente, Clarksville, Gordon E. Lynn, Severna Park, John M. Winter, Jr., North Shore, and Edward R. Higgins, Jr., Glen Burnie, Md., assignors to Westinghouse Electric Corporation, Pittsburgh, Pa., a corporation of Pennsylvania Filed May 3, 1963, Ser. No. 277,951
5 Claims. (Cl. 29—604)

ABSTRACT OF THE DISCLOSURE

Magnetic thin films in the order of 8,000 to 12,000 Angstroms thick are electrodeposited in a magnetic field on the first and second conducting substrate members, after which a first and second predetermined geometrical pattern of magnetic thin film bits is obtained by etching the magnetic thin film coatings. A suitable insulating medium is placed over the first and second pattern of bits and a conducting medium is then evaporated over the insulating medium after which the conducting medium is etched to obtain a plurality of first and second drive lines with the first drive lines on the first substrate member being formed in two coplanar sections having a passageway therebetween to accommodate a sense line. The two substrate members with their thin film bits, insulation, and conducting drive lines are then joined together with an insulating medium therebetween such that the drive lines are sandwiched between the thin film bits on the first and the second substrates.

Figure 1:
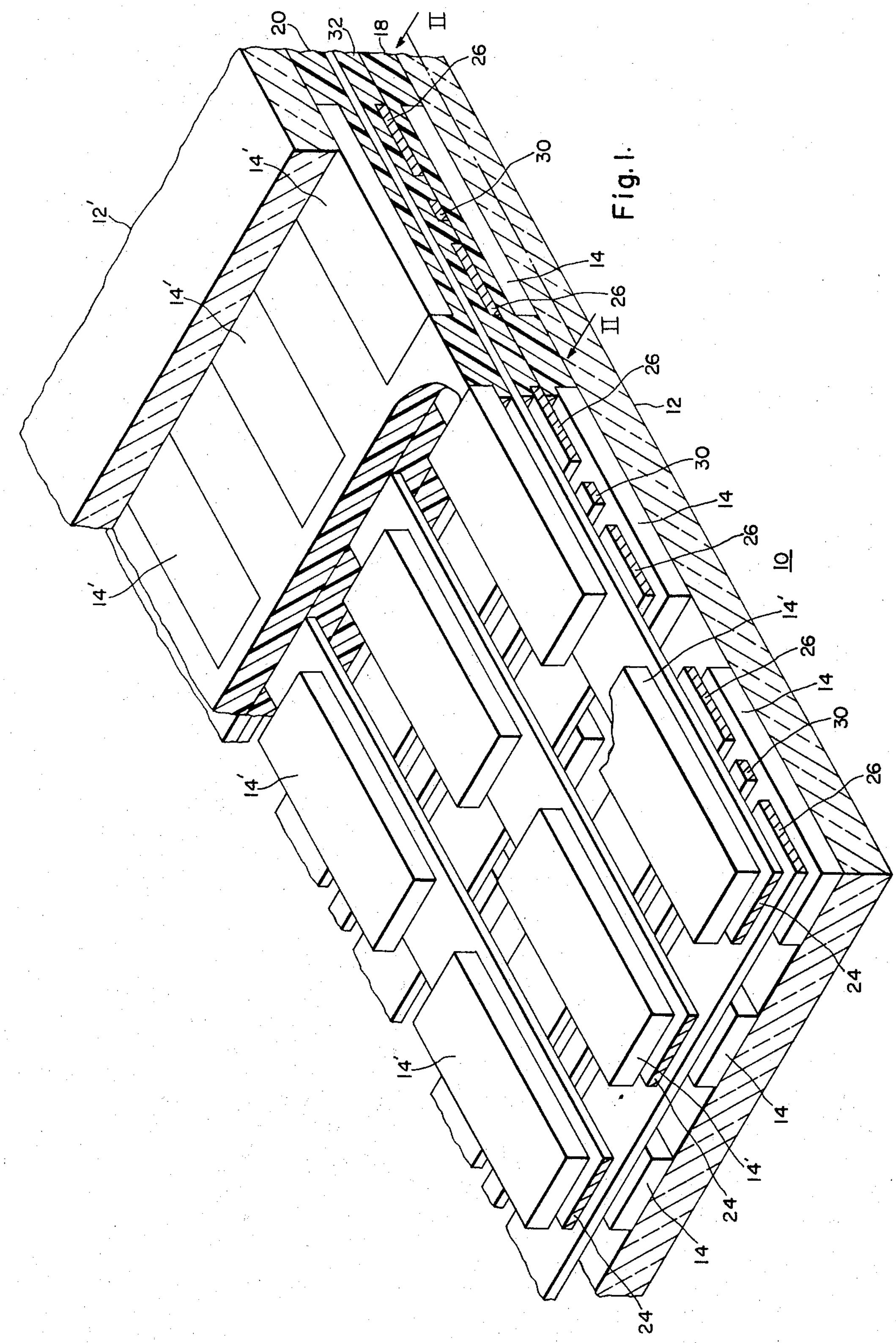

This invention in general relates to magnetic thin film memories, and more in particular to a sandwiched magnetic thin film memory.

With the increasing development in the field of micro and molecular electronics, electronic circuits are becoming smaller and smaller in physical size. By way of example, the memory portions of many digital computers are being fabricated in the form of a plurality of magnetic thin film information storage elements or bits, which eliminates the problem of bulk and threading of conventional toroidal ferrite cores. In the fabrication of the thin film bits a magnetic film is generally deposited onto a suitable substrate member in the presence of an externally applied magnetic field which causes the resulting thin film bits to have uniaxial anisotropic properties. That is, the magnetization vector of each bit aligns itself in a certain orientation which is called the easy axis of magnetization. These films are characterized by the fact that they possess two stable states of remanent magnetization and can be switched from one stable state along the easy axis to an opposite stable state along the easy axis upon the application of an externally applied field. These two stable states may be representative of a binary ONE and a binary ZERO in various digital circuits.

The externally applied field may be provided by drive lines to switch the stable states of the thin film elements, and the switching, or non-switching, of the thin film elements may be sensed by means of sense lines in which a voltage is produced due to the changing flux of a switching thin film element. It is desirable to have the magnetic thin film bits switch in a rotational switching mode as opposed to a domain wall switching mode wherein switching is accomplished in small regions or domains in the magnetic material, which domains are progressively reversed 180° until all of the magnetic moments are substantially aligned under the influence of the switching field.

Utilizing these basic properties of magnetic thin films, there has been proposed a magnetic thin film configuration wherein drive and sense lines are sandwiched between two magnetic thin films wherein the tendency would be towards faster switching speeds and higher signal to noise ratio of an output signal on the sense lines. These sandwiched thin film memories are generally formed by vacuum depositing a first thin film on a substrate member, depositing an insulating layer over the thin film, depositing drive and sense lines, depositing another layer of insulation, and finally depositing the upper thin film layer to complete the sandwich. In this type of configuration, it is extremely difficult to match the switching properties of the upper magnetic thin film with those of the lower magnetic thin film. In arrangements where the magnetic thin films are formed on separate substrates and then joined together with drive and sense means therebetween, the signal to noise ratio has been reduced due to the relatively large separation between the upper and lower magnetic thin films, which may be in the order of two or three mils or more. Many of these sandwiched thin film devices utilize a thin film having a thickness of a few thousand Angstroms, which thickness has been found to produce a relatively low output signal upon switching.

It is therefore one object of the present invention to provide a sandwiched magnetic thin film bit for use in memory arrays or the like, which provides a higher signal to noise ratio than heretofore.

It is another object to provide a sandwiched magnetic thin film element which operates at lower power and has a more reliable performance than those heretofore.

Another object is to provide a magnetic thin film memory array having a large storage capacity.

It is a further object to provide a method of making a magnetic thin film memory array which is characterized by its simplicity of production.

It is a further object to provide a method of producing a magnetic thin film memory array in a sandwich configuration which couples more magnetic flux to the sensing means to provide a high signal to noise ratio output signal.

It is a further object to provide a method of producing a magnetic thin film memory array in which the magnetic thin film bits switch coherently as a single domain.

Another object is to provide a sandwiched magnetic thin film memory bit in which the magnetic thin films are deposited with a uniform thickness greater than those heretofore.

Figure 2:
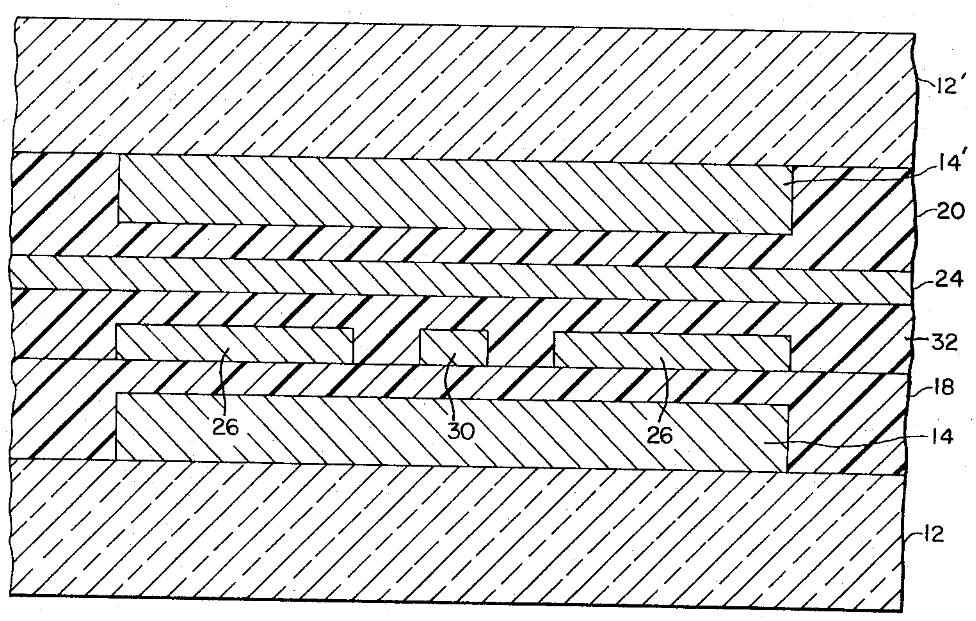

Briefly, in accordance with the above objects there is provided a process for making a sandwiched magnetic thin film element which includes the electrodeposition of the magnetic thin film upon separate substrate members to obtain uniformity, and then etching out a particular desired geometrical configuration. The above stated, and further objects, as well as further techniques of fabrication will become apparent upon a reading of the following detailed specification taken in conjunction with the drawings in which:

FIGURE 1 is a perspective view of a memory matrix incorporating the present invention; and FIG. 2 is a view taken along the line II—II of FIG. 1.

FIGURE 1 shows a perspective view, partially in section, of a memory matrix, in which the present invention finds application, although not limited thereto. A first substrate member 12 is provided and carries a plurality of magnetic thin film bits 14, each of the bits possessing an easy axis of magnetization and two stable states of remanent magnetization, preferably along the longitudinal axis of the rectangular bit. Although rectangular bits are illustrated, other geometrical designs may be incorporated. A second substrate member 12' is provided and carries a plurality of magnetic thin film bits 14', with each of these bits being substantially identical to its corresponding bit 14 on the substrate member 12. It has been found that to ensure proper operation which results in faster switching speeds and higher signal to noise ratio output signals, the bit 14' must be substantially equal in magnetic properties, dimensions, and thickness of its associated bit 14.

In order to insulate the magnetic thin film bits from associated drive and sense means, an insulating material 18 is deposited over the bits 14 and an insulating material 20 is deposited over the bits 14' as will hereinafter be described. A first driving means 24 is deposited over the insulating medium 20 such that the drive means 24 traverse the magnetic thin film bits in a direction substantially parallel to their easy axis of magnetization. Second drive means in the form of drive lines 26 are deposited over the insulating medium 18 in a direction substantially orthogonal to the first drive lines 24. In order to eliminate the need for an extra plane, the drive lines 26 are split into two coplanar sections to thereby accommodate a sense line 30. This elimination of an extra plane allows a closer separation of the thin film bits 14 and 14'. In order to couple the maximum energy from the drive lines 24 and 26 to the thin film bits 14 and 14' the overlapping areas of the drive lines 24 and 26 are made equal to the area of the thin film bits.

The two substrate members 12 and 12', with their deposited layers, are joined together with an insulating medium 32 therebetween. The resulting structure, with proper thicknesses and separations, as will hereinafter be described, provides a magnetic memory in which the flux closure paths of the magnetic thin film bits 14 and 14' are principally within the two film bits with almost no stray flux. That is, the matching corresponding thin film bit presents a much lower reluctance flux path than does air and consequently all the flux of a film loops the sense line to provide a higher output signal. The structure shown, in addition, effectively shields each sandwich element so that interference from stray signals is eliminated and greater packing densities may be obtained thereby resulting in an extremely large capacity memory. The key to the successful operation of the memory device shown in FIGURE 1 lies in the method of fabrication of the sandwiched magnetic thin film array and to this end reference is now made to FIGURE 2 which shows a single sandwiched magnetic memory bit corresponding to a view taken along line II—II of FIGURE 1.

A first conducting substrate member 12 is provided to receive a first coating of a magnetic thin film. In prior art devices this film was vacuum deposited as a coating or vacuum deposited through a mask onto a substrate member to obtain a plurality of thin film bits. This method is satisfactory for thin film bits a few thousand Angstroms thick, however, in the present invention operation may be accomplished with thicker films in the order of 8000 Angstroms thick. In order to deposit a magnetic film having these higher thicknesses, the magnetic film is electrodeposited in a magnetic field, on the conducting substrate member 12 and in this way the thickness and uniformity of the thin film coating may be obtained. In a similar manner a second thin film coating is electrodeposited upon the conducting substrate member 12'. The predetermined geometrical pattern of magnetic thin film bits, such as shown in FIGURE 1, is then obtained by etching the magnetic thin film coatings to obtain a plurality of magnetic thin film bits of which two, 14 and 14' are shown in FIGURE 2.

The process of electrodeposition on a conducting substrate member and subsequent etching of the magnetic bits results in a uniformity deposited thin film bit which may have a thickness having an upper range of approximately 8000 to 12,000 Angstroms thick and which method eliminates a fringing effect around the periphery of the magnetic thin film bits which causes an objectionable domain wall switching at the periphery. To ensure proper operation, the thin film bits 14 and 14' must be substantially identical in thickenss and magnetic properties as well as as in geometric area and by the method of manufacture described herein a plurality of substrate members may receive magnetic thin film coatings which may then be tested to obtain two magnetic thin films which have identical properties after which one thin film forms the bits 14 and the other identical thin film forms the bits 14'.

As an alternative, a single magnetic thin film coating may be electrodeposited upon a conducting substrate member which then may be divided to form the first and second conducting substrate members. After the rectangular magnetic thin film bits have been etched, an insulating medium 18 is deposited over the plurality of bits 14 and an insulating medium 20 is deposited over the plurality of bits 14'. A conducting medium is then evaporated over the insulating medium 20 and over the insulating medium 18. The conducting medium over the insulating medium 20 is etched to obtain the drive line 24 by suitable etching techniques and the conducting medium over the insulating medium 18 is etched to obtain the drive line 26 which is formed such that it has two coplanar sections having a passageway therebetween to accommodate a sense line 30. In a conventional memory matrix array the drive line 24 may be utilized as a word drive line. The two substrate members 12 and 12' are then joined together with an insulating medium 32 therebetween such that the conductor drive lines are sandwiched between the thin film bits 14 and 14'.

In an alternative method of fabrication the thin film bits may be formed as heretofore described and the drive, sense, and insulating layers formed over the bits on one substrate member after which, the second substrate member, with its bits, may be joined to the resultant structure.

As was stated, the closer the separation between the inner surfaces of the magnetic thin film bits 14 and 14', the better the operation of the memory device will be. The thickness of the drive wires is dependent upon the maximum resistance tolerable for the specific capacity of the memory matrix fabricated, and by way of example may be in the order of 10,000 Angstroms, depending upon the bit capacity. The insulating mediums 18 and 20 should be of just sufficient thickness to withstand the etchant utilized to etch the drive lines. The thickness of the spacer may vary and a sandwich magnetic thin film memory has been fabricated wherein the spacer 32 was in the order of 2000 Angstroms. This magnetic thin film memory bit had an insulation thickness of 5000 Angstroms and a drive line thickness of 10,000 Angstroms thus making a total separation distance between the inner surfaces of the thin film bit 14 and14' in the order of 32,000 Angstroms and the thin film bits 14 and 14' were in the order of 8000 Angstroms. The memory matrix fabricated according to the techniques described herein may attain switching speeds in the order of 1–2 nanoseconds. With extremely large capacity memories the substrate members 12 and 12' might have a tendency to assume concavity thus increasing the separation distance slightly in the order of one-half a mil, which still gives satisfactory performance.

Accordingly there has been provided by the method of manufacture described herein a magnetic thin film memory device which has a higher signal to noise ratio, is capable of greater packing density, and operates at nanosecond switching speeds. This is accomplished in part by the extremely small separation distance which the method described herein allows, the thicker magnetic thin film bits, and the geometry of the drive and sense means sandwiched between the magnetic thin film bits.

Although the present invention has been described with a certain degree of particularity it should be understood that the present disclosure has been made by way of example and that many modifications and variations of the present invention are made possible in the light of the above teachings.

We claim as our invention:

1. A method of making a magnetic thin film memory including the steps of:

(1) electrodepositing, in a magnetic field, a first magnetic thin film on a first conducting substrate member;

(2) electrodepositing, in a magnetic field, a second magnetic thin film, substantially identical to said first thin film, on a second conducting substrate member;

(3) eaching said first and second thin films to obtain an identical desired geometrical pattern of magnetic thin film bits on said first and second substrate members;

(4) depositing an insulating medium over said thin film bits;

(5) evaporating a conducting medium over said insulating medium covering the thin film bits on said first substrate member and said second substrate member;

(6) etching said conducting medium to obtain a desired conductor pattern traversing the thin film bits on said first substrate member, and a desired conductor pattern traversing the thin film bits on said second substrate member; and (7) joining said first and second substrate members, with an insulating medium therebetween, such that said conductor patterns are sandwiched between said first and second substrate members.

2. A method of making a magnetic thin film memory including the steps of:

(1) electrodepositing, in a magnetic field, a first magnetic thin film in the order of approximately 8000 A. to 12,000 A. thick, on a first conducting substrate member;

(2) electrodepositing, in a magnetic field, a second magnetic thin film, substantially identical to said first thin film, on a second conducting substrate member;

(3) etching said first and second thin films to obtain an identical desired geometrical pattern of magnetic thin film bits on said first and second substrate members;

(4) depositing an insulating medium over said thin film bits;

(5) evaporating a conducting medium over said insulating medium covering the thin film bits on said first substrate member and said second substrate member;

(6) etching said conducting medium to obtain a desired conductor pattern traversing the thin film bits on said first substrate member, and a desired conductor pattern traversing the thin film bits on said second substrate member; and (7) joining said first and second substrate members, with an insulating medium therebetween, such that said conductor patterns are sandwiched between said first and second substrate members.

3. A method of making a magnetic thin film memory including the steps of:

(1) electrodepositing, in a magnetic field, a first magnetic thin film on a first conducting substrate member;

(2) electrodepositing, in a magnetic field, a second magnetic thin film having the same thickness and properties as said first thin film, on a second conducting substrate member;

(3) etching said first thin film to obtain a first plurality of thin film memory bits with each bit possessing an easy axis of magnetization;

(4) etching said second thin film to obtain a second plurality of thin film memory bits, said first and second plurality being identical;

(5) depositing an insulating medium over said thin film bits;

(6) evaporating a conducting medium over said insulating medium;

(7) etching said conducting medium to obtain a first plurality of drive lines traversing said first plurality of thin film bits and substantially parallel to said easy axis;

(8) etching said conducting medium to obtain a second plurality of drive lines and a plurality of sense lines, said second plurality of drive lines traversing said second plurality of thin film bits and substantially orthogonal to said easy axis, each said sense lines being parallel to said second plurality of drive lines and coplanar therewith; and (9) joining said first and second substrate members such that said drive and sense lines lie between the inner surfaces of said first plurality and said second plurality of thin film memory bits.

4. A method of making a magnetic thin film memory including the steps of:

(1) electrodepositing, in a magnetic field, a first magnetic thin film on a first conducting substrate member;

(2) electrodepositing, in a magnetic field, a second magnetic thin film having the same thickness and properties as said first thin film, on a second conducting substrate member;

(3) etching said first thin film to obtain a first plurality of thin film memory bits with each bit possessing an easy axis of magnetization;

(4) etching said second thin film to obtain a second plurality of thin film memory bits, said first and second plurality being identical;

(5) depositing an insulating medium over said thin film bits;

(6) evaporating a conducting medium over said insulating medium;

(7) etching said conducting medium to obtain a first plurality of drive lines traversing said first plurality of thin film bits;

(8) etching said conducting medium to obtain a second plurality of drive lines and a plurality of sense lines, said second plurality of drive lines traversing said second plurality of thin film bits and substantially orthogonal to said easy axis, each said sense lines being parallel to said second plurality of drive lines and coplanar therewith; and (9) joining said first and second substrate members such that the inner surfaces of said first plurality and said second plurality of thin film memory bits are separated by approximately .4 mil but less than .8 mil, with said drive and sense lines therebetween.

5. A method of making a magnetic thin film memory including the steps of:

(1) electrodepositing, in a magnetic field, a magnetic thin film on a conducting substrate member;

(2) dividing said substrate member to obtain a first substrate member and a second substrate member, each having said magnetic thin film thereon;

(3) etching said thin films on said first and second substrate members to obtain an identical desired geometrical pattern of magnetic thin film bits on said first and second substrate members;

(4) depositing an insulating medium over said thin film bits;

(5) evaporating a conducting medium over said insulating medium covering the thin film bits on said first substrate member and said second substrate member;

(6) etching said conducting medium to obtain a desired conductor pattern traversing the thin film bits on said first substrate member, and a desired conductor pattern traversing the thin film bits on said second substrate member; and (7) joining said first and second substrate members, with an insulating medium therebetween, such that said conductor patterns are sandwiched between said first and second substrate members.

References Cited

UNITED STATES PATENTS 3,276,000 9/1966 Davis ------------ 29—604 X

OTHER REFERENCES

"Instruments and Control Systems," vol. 34, March 1961, pp. 451–454.

WILLIAM I. BROOKS, *Primary Examiner.*